United States Patent [19]

Kasmarik et al.

[11] 3,907,386
[45] Sept. 23, 1975

[54] BEARING ASSEMBLY SYSTEMS
[75] Inventors: Joseph R. Kasmarik, Stratford; Ambros S. Hoffmann, West Haven, both of Conn.
[73] Assignee: Avco Corporation, Stratford, Conn.
[22] Filed: Jan. 11, 1974
[21] Appl. No.: 432,714

Related U.S. Application Data
[62] Division of Ser. No. 325,137, Jan. 22, 1973, Pat. No. 3,792,586.

[52] U.S. Cl. ................................................. 308/15
[51] Int. Cl.² ........................................ F16C 13/00
[58] Field of Search ........................ 308/15, 22, 27

[56] References Cited
UNITED STATES PATENTS
3,473,853  10/1969  Goss et al. ............................ 308/15
3,504,952   4/1970  Farmer ................................. 308/15

Primary Examiner—M. Henson Wood, Jr.
Assistant Examiner—Gene A. Church
Attorney, Agent, or Firm—Charles M. Hogan; Irwin P. Garfinkle

[57] ABSTRACT

A mid-span bearing support for the power take-off shaft of a fan type gas turbine engine is described. The power take-off shaft extends radially through frame struts in the core engine inlet and fan ducts of the engine. These struts are separated by a gap in which a bearing assembly is mounted to journal the power take-off shaft. This assembly includes a spring bellows which permits the height of the assembly to be reduced by a rotatable sleeve to permit retraction of interdigitating locating means in the installation and removal of the assembly. The spring bellows also provides sealing pressure of the assembly against opposed surfaces of the gap so that oil may flow through the struts and assembly for return to the engine's oil pump.

3 Claims, 4 Drawing Figures

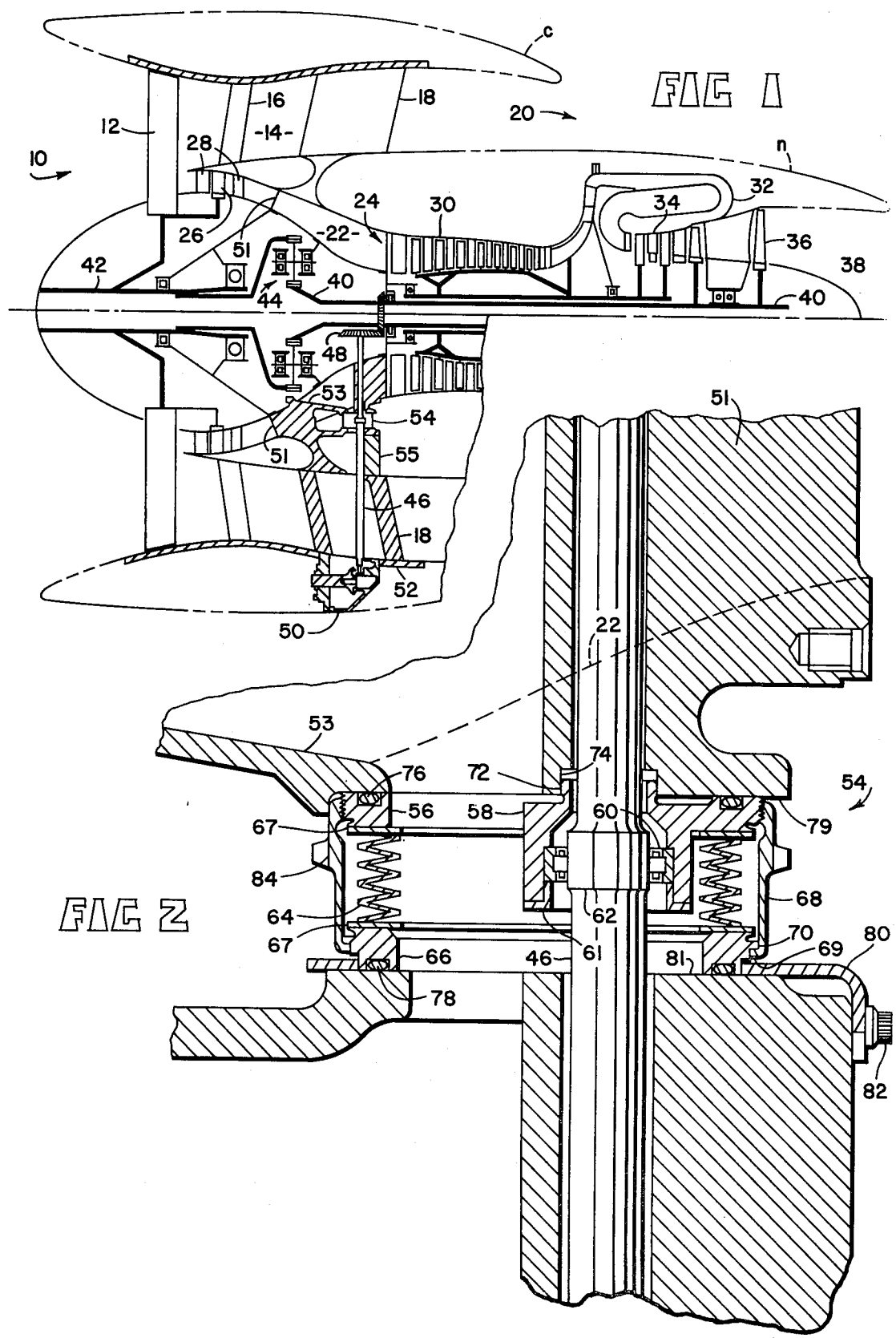

BEARING ASSEMBLY SYSTEMS

This is a division of application Ser. No. 325,137 filed Jan. 22, 1973 now U.S. Pat. No. 3,792,586.

The present invention relates to improvements in bearing support systems for journaling of shafts, particularly in fan type gas turbine engines.

One essential element of most, if not all gas turbine engines, is a power take-off shaft. This shaft is driven from a central engine shaft and usually extends radially to an outer case where driving connections are made to fuel and oil pumps and other engine accessories necessary for engine operation.

In fan type engines, serious difficulties are encountered in providing a power take-off shaft where it is desired to extend this shaft to a gear box mounted on the outer fan duct casing. In such a configuration, the shaft is quite long while its diameter must be minimized due to weight and other considerations. Such factors lead to the need for a mid-span bearing to support the shaft and prevent flexure.

Incorporation of a mid-span journal is further complicated by the need or desirability of co-ordinating the bearing installation with the lubrication system of the engine for the return of oil from internal engine sumps to an externally mounted oil pump.

Accordingly, one object of the invention is to provide an improved mid-span journal for the power take-off shaft of a fan type gas turbine engine in a coordinated fashion with the lubrication system thereof and in so doing to economically provide for installation and maintenance of the mid-span bearing as well as providing against the relatively hostile operating environment to be encountered during engine operation.

Another and broader object of the invention is to provide an improved bearing support for a shaft which extends between hollow housing portions separated by a gap.

These ends are attained by a gas turbine engine having a frame with aligned, lower struts extending radially through the core engine inlet and fan ducts of the engine. A power take-off shaft extends radially from a central engine shaft through these struts, spanning a gap provided therebetween. A bearing assembly is provided in this gap and comprises a pair of rings having a compressed spring bellows therebetween. This assembly surrounds the power take-off shaft with the outer surfaces of the ring sealingly engaging opposed parallel surfaces of the separating gap. One of the rings is provided with a lug within which is mounted a bearing that journals the power take-off shaft. Means extending in axially interdigitating relationship between the frame and one of the rings, preferably the bearing ring, accurately locate the assembly relative to the frame and the power take-off shaft. Means, preferably in the form of a sleeve threaded to one of the rings, are provided for reducing the overall height of the assembly to permit lateral displacement of the assembly when the shaft is withdrawn. When such a sleeve is used, means are also provided to prevent rotation of the assembly relative to the frame. Further, in this combination, the internal sump of the engine drain into the lower engine inlet duct which is hollow to permit the oil to flow through the bearing assembly, to the aligned fan duct strut, which is also hollow, for return to the engine's oil pump.

Many of the bearing assembly features may, in accordance with the broader aspects of the invention, be utilized in journaling a shaft which extends between and spans a gap separating two housing portions.

The above and other related objects and features of the invention will be apparent from a reading of the following description of a preferred embodiment of the invention and the novelty thereof pointed out in the appended claims.

In the drawings:

FIG. 1 is a simplified schematic view, in partial, longitudinal section, of a gas turbine engine in which the present invention is embodied;

FIG. 2 is an enlarged longitudinal section, showing in greater detail, a bearing assembly which is briefly indicated in FIG. 1;

Figure 3:
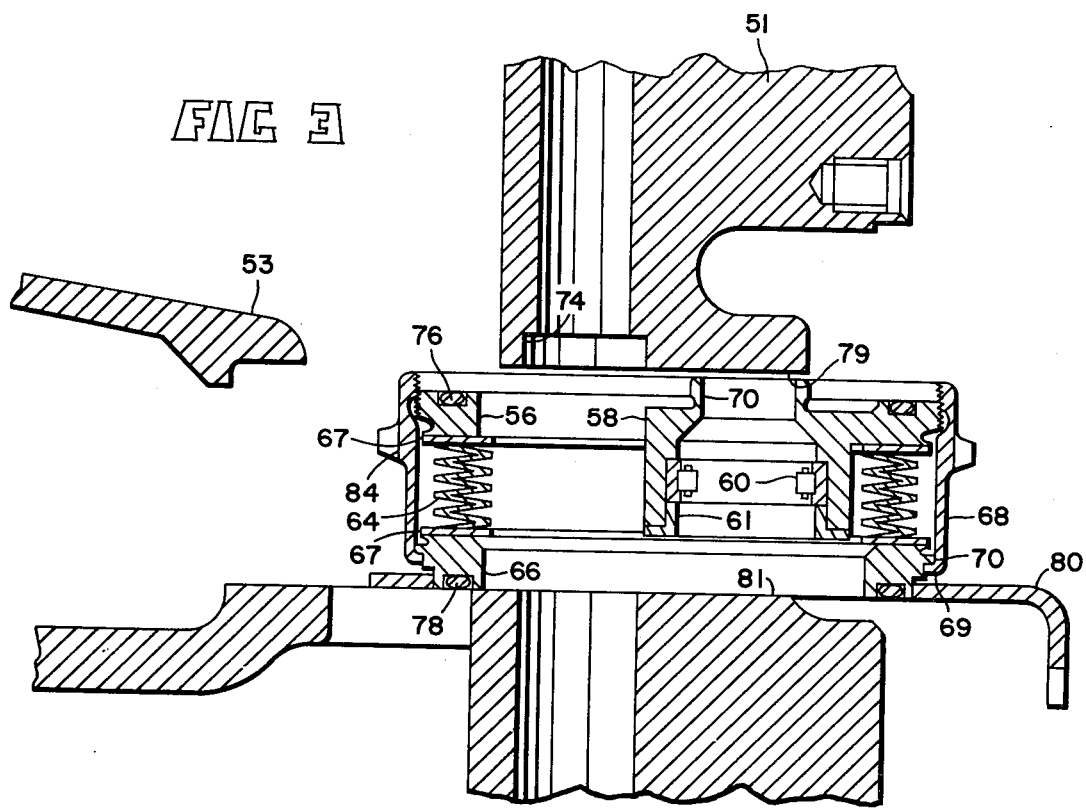
FIG. 3 is a section similar to FIG. 2 illustrating installation of the bearing assembly.

FIG. 1 depicts a fan type, gas turbine engine as utilized for the propulsion of aircraft. In the aircraft system, this engine is mated with an outer cowl $c$ and an inner nacelle $n$ which are illustrated by broken lines. Air entering the engine inlet 10 is first pressurized by a single stage of fan blades 12. A portion of this air is split to enter an outer, annular by-pass duct 14. This air then passes through a circumferential row of stationary vanes 16 and then between struts 18 which form a portion of the load carrying frame structure of the engine. The by-pass fan air is then discharged through a nozzle 20, defined by the cowl $c$ and by the nacelle $n$, to provide a propulsive force.

The inner portion of the air discharged from the fan blades 12 is directed through an inlet duct 22 to a core engine 24. On first entering the duct 22, the air is further pressurized by a circumferential row of blades 26 which are disposed between stater vanes 28. The fan blades 12 and booster blades 26 comprise what is referenced as a low pressure compressor.

The air passes from the core engine inlet passageway 22 to a compressor 30 having a series of axial flow stages and a final centrifugal stage. The pressurized air then enters a combustor 32 to support combustion of fuel in the generation of a hot gas stream. The hot gas stream then enters a two stage, high pressure turbine 34 where a portion of its energy is extracted to drive the rotor of the compressor 30. The hot gas stream then passes through a low pressure, two stage turbine 36, to drive the low pressure compressor as will be further described. The remainder of the energy of the hot gas stream is then converted to a propulsive force by being discharged through a nozzle 38 at the downstream end of the nacelle $n$.

The blade and vane arrangements of the high pressure compressor 30 and the turbines 34 and 36, will be well known to those skilled in the art, without further description, sufficient for an understanding of this invention. However, for clarity of illustration, the rotating elements forming a load bearing path and to which the various blades are attached, have been indicated in heavy lines. It will further be apparent from the drawing that various bearing assemblies are provided to properly journal the rotating components. One additional point to be noted in the low pressure system, is that the blades of turbine 36 are mounted on a shaft 40 which drives a forward shaft section 42, on which the blades 12 and 26 are mounted, through a gear train 44, to thereby obtain the proper rate of rotation of the fan.

As herein shown, a power take-off shaft 46 is driven from the power shaft 40 through a gear connection indicated at 48. The power take-off shaft 46, however, may be driven by the compressor rotor instead. The shaft 46 extends to a gear box 50 mounted on the exterior of an outer fan frame casing 52. Various connections are made from the gear box 50, in known fashion, to drive the fuel and lube pumps and other accessory equipment of the engine.

At this point it will be noted that the frame structure of the engine defines a sump structure into which oil utilized for lubricating the various bearings and gears, is drained and collected, for returning to the oil pump or pumps which pressurize it for continuous lubrication of the desired components. Also, struts 51 extend radially through the passageway 22 to provide a load bearing path connecting the frame structure to internal bearing mounts and the like. The low point of the referenced sump is formed in the hollow, lower strut 51, as indicated at 53. From the low point of the sump, the oil flows through a bearing assembly 54, through a hollow column 55, through the lower or 6 o'clock frame strut 18 and then to the gear box 50 for return to the oil pump. It will also be apparent that the power take-off shaft 46 also passes through these same struts 51 and 18 as well as the bearing assembly 54 and column 55.

Due to the length of the power take-off shaft 46 and its relatively small diameter, for purposes of minimizing weight, it is highly desirable, if not essential, that a midspan bearing support be provided. To this end, the bearing assembly being shown in greater detail in FIGS. 2–4. It will also be evident that assembly is located in a gap between the struts 51 and 18, and since oil passes therethrough, the bearing assembly must also function as a seal.

More particularly, the assembly 54 comprises a bearing support ring or flange 56 which has a lug 58 projecting inwardly thereof and through which the shaft 46 is telescoped. A roller bearing 60 is mounted within the lug 58 and held in place by a retainer 61. The bearing 60 rotatably supports and positions the shaft 46 by engagement with a race-forming land 62 formed on the shaft 46. It will be seen that clearance is provided between the shaft 46 and those portions of the strut 51 and column 55 so that oil will flow to and from the bearing 60.

A spring bellows 64 is connected at its upper end to the ring 56 and at its lower end to a ring 66, through mounting washers 67. A sleeve 68 encompasses these elements and is threadably attached at its upper end to the ring 56. An inturned lip 69 at the lower end of the sleeve 68 is engagable with the lower surface of a lip 70 formed on the ring 66.

This bearing assembly is accurately located relative to the frame structure by a pilot 72 which is axially interdigitated into a hole 74 surrounding the shaft 46. O-rings 76 and 78 are positioned within grooves formed respectively on the upper surface of the ring 56 and the lower surface of the ring 66. These O-rings sealingly engage opposed, parallel surfaces 79 and 81 formed respectively at the lower end of the strut 51 and top of the column 55 on opposite sides of the gap therebetween. The lower end of the bearing assembly is further restrained by a bracket 80 which surrounds the lower end of the ring 66 and is held in place by a screw 82 which is threaded into the column 55.

Figure 4:
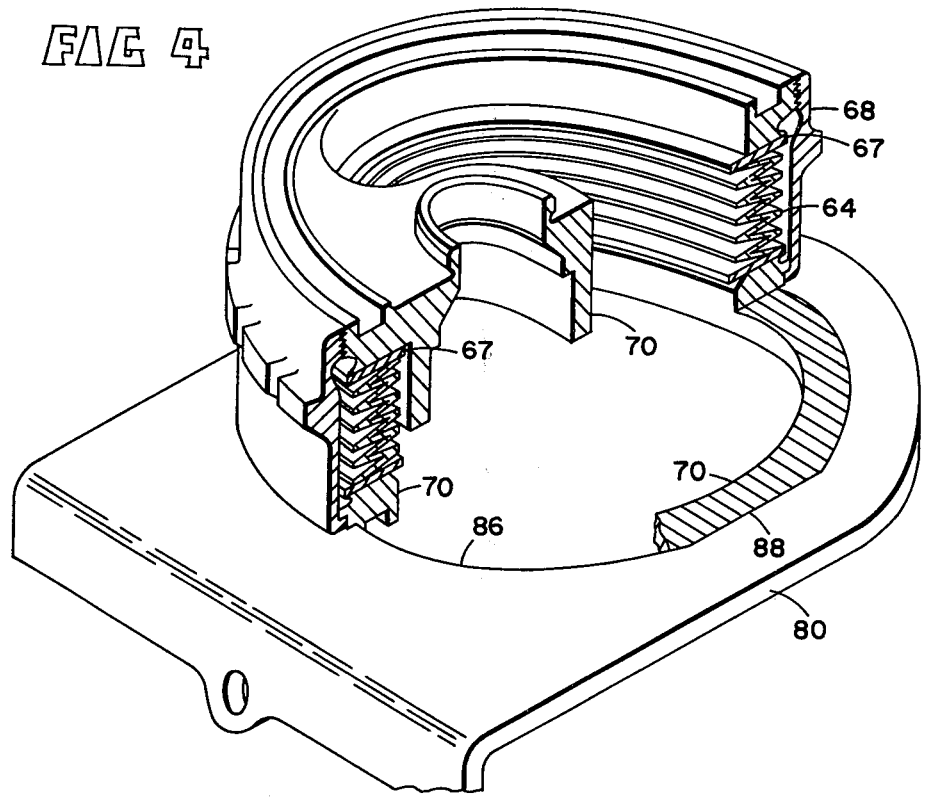
FIG. 4 is a perspective view, with portions broken away and in section, of the bearing assembly.

The procedure for installing the bearing assembly 54, as above described, is illustrated in FIG. 3. This assembly is installed in place prior to mounting the shaft 46. Also, at this time, the sleeve 68 has been rotated to reduce the overall height of the assembly. The outer surface of the sleeve 68 is provided with slots 84 to facilitate rotation of the sleeve by the spanner wrench or the like. Also, the bracket 80 has been slipped over the lower end of the ring 66. With the overall height of the assembly reduced to less than the height of the gap or opening between the surfaces 79 and 81, it may then be readily slipped into place. At this point, it should be noted that the hole, indicated at 86 in FIG. 4, in the bracket 80 which receives the ring 66 is non-circular, being flattened at 88. The lower end of the ring 66 has a matching non-circular outline to thus prevent rotation of the ring 66 relative to the bracket 80. After the assembly 54 has been positioned as in FIG. 2 and the screw 82 secured, a spanner wrench can be used to rotate the sleeve 68 permitting the ring 56 to be urged upwardly by the spring bellows 64 as the pilot 72 is axially extended to enter the positioning hole 74.

The sleeve 68 is preferably unthreaded sufficiently for the spring bellows 64 to yieldingly maintain the O-rings 76 and 78 in sealing engagement with the respective surfaces 79 and 81. The bellows 64 remains compressed and provides sufficient pressure to maintain such sealing engagement even taking into consideration the fact that the spacing between the surfaces 79 and 81 will vary due to thermal growth and some possible vibration perterbations.

Once the bearing assembly 54 is thus installed, the shaft 46 may then be introduced from the outer side of the frame casing 52. The inner end of the shaft 46 may have a spline connection with the gear 48 to permit such assembly.

Removal of the seal assembly is simply a reversal of the above described procedure, namely the sleeve 68 would be rotated to reduce the overall height of the assembly and withdraw the pilot 72 from the hole 74. The screw 82 would then be removed and the assembly slipped out after removal of the shaft 46.

Variations of the described embodiment of the invention will occur to those skilled in the art within the spirit and scope of the present inventive concepts which are therefor to be limited solely by the following claims.

Having thus described the invention, what is claimed as novel and desired to be secured by Letters Patent of the United States is:

1. A housing comprising
   two opposed portions separated by a gap, said portions having shaft receiving openings,
   said opposed portions respectively having opposed parallel surfaces surrounding said openings and defining opposite sides of said gap,
   a shaft extending through the opening of said opposed portions and spanning said gap, and
   a bearing assembly disposed in said gap and comprising a pair of flanges surrounding said shaft and respectively juxtaposed relative to said opposed surfaces for sealing relation therewith,
   a compressed spring bellows extending between said flanges and urging them in opposite directions, a bearing mounted on one of said flanges and journaling said shaft, means interdigitating axially between one of said flanges and said housing for accurately locating said bearing relative to said housing and said shaft, and means connected between said flanges for reducing the overall height of said bearing assembly to permit lateral removal of the bearing assembly from said gap when said shaft is withdrawn.

2. A housing as in claim 1 wherein the flanges are in the form or rings and the interdigitating means extend between the housing and the ring on which the bearing is mounted.

3. A housing as in claim 2 wherein the interdigitating means comprise a pilot formed concentrically of said bearing and extending into a locating hole formed in the adjacent housing portion and the height reducing means comprise a sleeve surrounding said rings, said sleeve being threaded onto one of said rings and having an inturned flange underlying a circumferential rim formed on the outer ring and further comprising means for preventing relative rotation between said assembly and said housing to facilitate rotation of said sleeve in varying the height of said assembly during its installation and removal.

* * * * *